United States Patent [19]

Irrlitz et al.

[11] Patent Number: 4,623,572

[45] Date of Patent: Nov. 18, 1986

[54] METHOD AND APPARATUS FOR PRODUCING TEXTURED NAPPED SURFACES

[75] Inventors: Hans U. Irrlitz, Schwarzenbach; Werner Kick, Weiden; Hans Sommer, Schirmitz, all of Fed. Rep. of Germany

[73] Assignee: Flachglas AG, Fürth, Fed. Rep. of Germany

[21] Appl. No.: 671,046

[22] Filed: Nov. 13, 1984

[51] Int. Cl.[4] .................... B05D 1/16

[52] U.S. Cl. .................... 428/90; 427/200; 427/206; 427/264; 427/355; 118/57; 118/102

[58] Field of Search .................... 427/200, 206, 26, 264, 427/369, 355; 118/57, 102, 123; 428/90, 91

[56] References Cited

U.S. PATENT DOCUMENTS

| | | | |
|---|---|---|---|
| 2,345,941 | 4/1944 | Lehman | 427/355 X |
| 2,563,259 | 8/1951 | Miller | 427/206 |
| 3,917,883 | 11/1975 | Jepson | 427/200 X |
| 3,922,404 | 11/1975 | Priester | 428/90 |
| 4,094,674 | 6/1978 | Valancius | 427/355 X |

FOREIGN PATENT DOCUMENTS 1085795 4/1965 Fed. Rep. of Germany .

OTHER PUBLICATIONS

German Industrial Standard DIN 53,505, Testing of Elastomers; Shore A and D Hardness Test; Aug. 1973; pp. 315–317.

*Primary Examiner*—Shrive P. Beck

*Attorney, Agent, or Firm*—Spencer & Frank

[57] ABSTRACT

A method and apparatus for the production of napped surfaces that are textured lightly and irregularly. The surface of a substrate is coated with an adhesive and then covered with short textile fibers to form a layer of nap. After the adhesive hardens, the nap layer is subjected to mechanical deformation by permitting a plurality of balls made of a resilient material to bounce on the layer. The apparatus includes a panel of backing material support for the substrate, such as a panel of material which is to be treated and which already has a nap layer on its surface. Below the support is disposed a vibrator mechanism which causes the support together with the panel of material disposed thereon to vibrate. Above the support and the panel of material disposed thereon, there is a treatment chamber having lateral partitions and an impact ceiling. Within the treatment chamber there is a plurality of balls made of a resilient material.

6 Claims, 4 Drawing Figures

11
24
20
25
21
26
22
27
23
28
12
11
33
32
14
13
13
10
6
31
5
7
8
2
3
1
1
30
4

12
13'
14
11
11
10'
6
31
5
7'
9
35
9
36
2
3
1
1
4

31
6
5
34

6
5

METHOD AND APPARATUS FOR PRODUCING TEXTURED NAPPED SURFACES

BACKGROUND OF THE INVENTION

The present invention relates to a method for producing napped surfaces that are lightly and irregularly textured, by coating a panel of backing material with an adhesive, covering it with short textile fibers to form pile on it, preferably in an electrical field, hardening the adhesive, and then mechanically deformating the pile.

Such a method is disclosed in German Pat. No. 1,085,795. It is intended for the production of moire-like patterns and the procedure is such that the napped surface, after the adhesive has hardened, is moistened with waterproofing solutions and then the tiny fibers are bent over at individual locations by pressing them with a pressing member while simultaneously rotating the pressing member, whereupon the surface is dried. The panels of backing material for the nap layer in that patent are planar structures of textile fibers or the like, for example, woven textiles, nonwoven materials or the like. It has been found, however, that other surfaces can also be treated, for example thin plastic sheets, plates of suitable materials and the like. The selection of pile fibers is a significant factor in the success of the process. German Pat. No. 1,085,795 recommends the use of rayon fibers, which are somewhat longer than the textiles previously employed to form the nap but whose length generally is not more than 1.5 mm. In contrast thereto, fibers having a length of about 3 mm or even somewhat more are used to produce moire-type patterns.

The prior art method is suitable merely for the production of relatively coarse structures. If finer structures are to be produced, for example for the manufacture of suede-like surfaces, longer fibers are unsuitable and it is necessary, in departure from prior art recommendations, to use particularly short fibers. These again can no longer be deformed according to the prior art methods so that the fine iridescent effects of suede cannot be produced with these methods.

SUMMARY OF THE INVENTION

It is the object of the present invention to improve the prior art methods for the production of textured, napped surfaces so that even finer textured surfaces, for example those having a suede-like appearance, can be produced.

This object can be achieved, according to the present invention, by bouncing a plurality of balls made of a resilient material on a napped surface to deform the nap layer. It is of particular advantage if the nap layer is made of regenerated cellulose having a fiber length from 0.35 to 0.90 mm, preferably 0.50 mm, and if balls of a resilient material are employed which have a Shore A hardness of 50° to 70° ShA. The Shore A hardness, according to German Industrial Standard DIN 53,505, is a resiliency value measured in a Shore apparatus and determined with the use of a blunt measuring tip of steel and a drop weight of 200 g. Balls suitable for use with the present invention may be made of low density polyethylene, polyvinyl acetate and an ionomer. The term "ionomer" means thermoplastic copolymers of ethylene with carboxyl-group-containing monomers, with part of the carboxyl groups being present in free form and the remainder being saturated with metals of the alkali or earth alkali groups. The treatment time to which the nap layer is subjected should be from 10 to 20 seconds, e.g. 15 seconds.

An apparatus for implementing the method in order to treat a napped object, such as a panel of backing material having a napped surface, includes essentially the following features:

(a) a backing material support for the napped objects or panel of material;

(b) a vibrator mechanism disposed below the support to vibrate the support together with the panel of material or other objects disposed thereon;

(c) a treatment chamber disposed above the support and the panel of material or other objects disposed thereon, the treatment chamber having lateral delimiting walls as well as an impact ceiling; and (d) a plurality of balls made of a resilient material within the treatment chamber.

The vibrator mechanism should preferably be an electromagnetic vibrator operating at a frequency from 20 to 50 Hz. Instead of such an electromagnetic vibrator, however, other devices can also be employed. For example, if the support is an endless belt that is mounted for movement, the vibrator mechanism may be provided by a row of profiled members which have multiple edges and which are arranged one behind the other so that the row extends in the direction of movement of the support, each profiled member extending transversely to the direction of movement of the support. These multi-edge profiled members must then be rotatable about their longitudinal axes so that, when rotated, their edges abut against the support and cause it to vibrate, similarly to the above-mentioned vibrator.

Preferably, the treatment chamber is to be partitioned into a plurality of subchambers succeeding one another in the direction of movement of the support. A plurality of balls is disposed in each chamber. The balls preferably have a diameter from 35 to 50 mm and each weigh from 40 to 60 g. In a preferred embodiment, the entire treatment chamber has a length of 1000 mm, a width of 1800 mm and a height of 60 mm, is partitioned over its length into five subchambers, and each subchamber contains about 80 balls.

DESCRIPTION OF THE PREFERRED EMBODIMENTS

Figure 1:
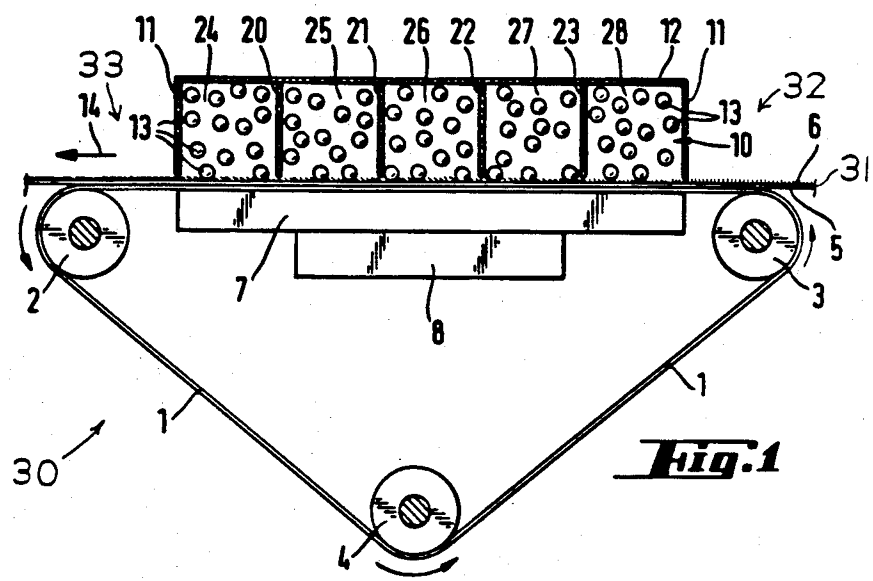
FIG. 1 is a longitudinal sectional view schematically illustrating one embodiment of the present invention, the illustration including a treatment chamber and an electromagnetic vibrator.

The texturing apparatus 30 shown in FIG. 1 includes a backing material support 1, which may be a woven band, a plastic band or the like. Support 1 forms an endless loop which, in the illustrated embodiment, is guided around three deflection rollers 2, 3, and 4, of which at least one is driven by means which are not shown. A web 31 having a napped surface is positioned on the upper, almost horizontal reach of support 1 and is transported thereby, in the direction of arrow 14, from the entry position 32 of texturing apparatus 30 to the exit position 33 thereof.

Figure 3A:
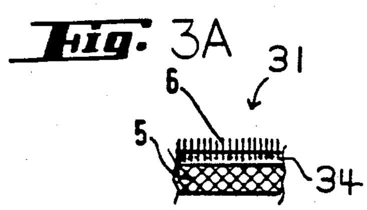
FIG. 3A is a sectional view of a panel of backing material having fibers adhesively affixed thereto to form a napped surface, before the surface is textured by the bouncing balls.

FIG. 3A illustrates the configuration of web 31 at entry position 32. Web 30 includes a panel 5 of material, such as a textile material, a nonwoven material, a plastic material or the like, with the panel of material already being provided with a covering or layer of pile 6 when it enters texturing apparatus 30. The pile 6 of this layer is preferably made of regenerated cellulose having a fiber length from 0.35 to 0.90 mm, preferably 0.5 mm. During fabrication of web 31, the fibers (pile) are preferably applied in an electrostatic field so that they are oriented essentially perpendicularly, or at least almost perpendicularly, to the panel 5 of material. The fibers are retained in a known manner by means of a layer 34 of adhesive which is applied to the panel 5 of material immediately prior to the application of the nap, for example by spreading or spraying it on. After the layer 34 of adhesive hardens, excess pile 6 is removed by suction and/or by brushing the excess fibers away, so that web 31 is neatly and completely napped, as illustrated in FIG. 3A, when it is deposited on support 1.

Returning to FIG. 1, a vibrator mechanism 7 is disposed below the upper, almost horizontal reach of support 1, so that support 1 slides along and is kept from sagging by mechanism 7. This vibrator mechanism 7 is sufficiently powerful to cause the support 1 together with the web 31 disposed thereon to vibrate forcefully. In the embodiment shown in FIG. 1, the vibrator mechanism 7 is a known electromagnetic shaker device whose operating frequency can be set from 20 to 50 Hz. The vibrator is supported by a supporting platform 8, which is shown only symbolically in the drawing.

Figure 2:
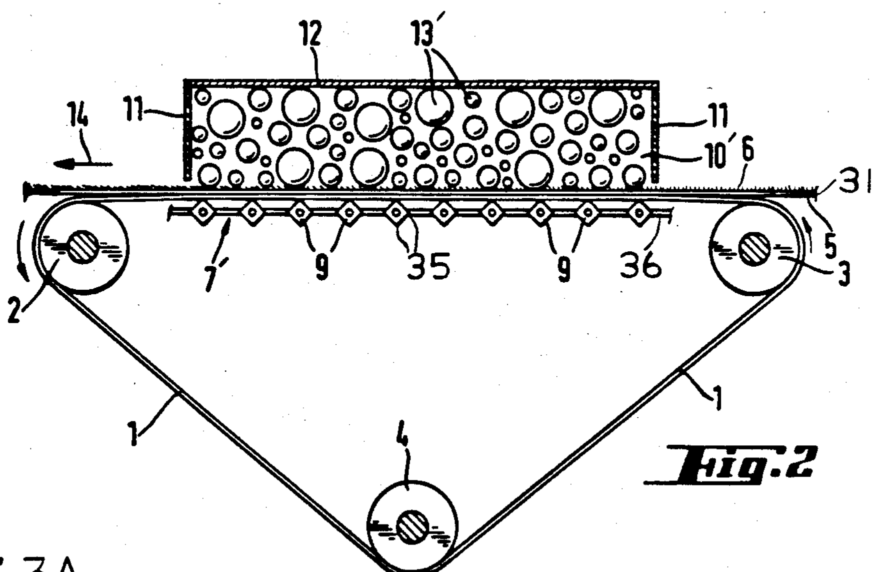
FIG. 2 is a longitudinal sectional view schematically illustrating another embodiment, wherein the electromagnetic vibrator has been replaced by a number of multi-edge profiled members.

In the modified embodiment shown in FIG. 2, the vibrator mechanism 7' is composed of a plurality of elongated rods 9 having profiles with multiple edges 35. The rods 9 are journaled for rotation by support 36 and have longitudinal axes which extend transverse to the direction of movement of support 1 and web 31. The multi-edged rods 9 are rotated by a mechanism (not shown) so that the edges 35 of the rods hit against the underside of the backing material support 1 and cause it to vibrate at a rate depending on the rpm of rods 9. Here again it is advisable to make the rate of rotation adjustable so that the vibration frequency can be adjusted within certain limits.

Returning to FIG. 1, a treatment chamber 10 having lateral delimiting walls 11 as well as an impact ceiling 12 is disposed above support 1 and web 31. Treatment chamber 10 must be designed to be relatively stable since it is subjected to considerable stresses. Treatment chamber 10 does not rest on web 31 but is instead independently supported slightly above web 31, so that a slight gap exists. It should be noted that the bottom edges of chamber 10 tend to limit the vertical movement of support 1 and web 31 during vigorous vibration, thereby retaining them in position so that they do not flap around.

The treatment chamber 10 shown in FIG. 1 is divided by means of partitions 20 to 23 into five approximately identically sized chambers 24 to 28. Within treatment chamber 10 there is a plurality of balls 13 of a resilient material. Although the balls may have different diameters (see balls 13' within chamber 10' in FIG. 2), it is possible, and even preferred in many cases, for the balls to all have the same diameter, as shown in FIG. 1.

In operation of the device, support 1 is caused to rotate; it then conveys the web 31 in the direction of arrow 14 through treatment chamber 10. At the same time, vibrator mechanism 7 is turned on so that support 1 and web 31 disposed thereon are vibrated intensively. As a result of these vibrations, balls 13 are thrown upwardly; they soon hit impact ceiling 12 and, due to their resilient characteristic, rebound back onto web 31. The balls 13 bounce back and forth with great force within the treatment chamber 10 so that pile 6 on panel 5 of material is subjected to intensive bombardment.

The partition of the treatment chamber 10 into a plurality of subchambers as shown in FIG. 1 stabilizes the paths traversed by the balls 13 so that they always hit the pile 6 in a perpendicular direction.

Figure 3B:
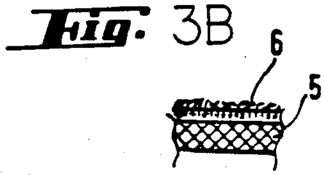
FIG. 3B is a sectional view of the panel of backing material and fibers after the napped surface has been textured by bombardment of the bouncing balls.

If the operating frequency of vibrator mechanism 7 is adjustable, it is possible to set this frequency within a frequency range from 20 to 50 Hz, for example, so as to attain the resonant frequency of the bouncing balls 13. In this way it is possible to effect a continuous and substantially uniform bombardment of the pile layer 6 with a minimum of energy expended. The conveying speed of the support 1 in the direction of arrow 14 is advantageously set in such a manner that the treatment period to which the web 31 is subjected in treatment chamber 10 is 10 to 20 seconds. With such a short but intensive bombardment of the layer of pile 6, the fibers of the layer 6, which were originally oriented approximately perpendicularly as in FIG. 3A, are bent over. If the type of fiber employed is selected correctly in accordance with the guidelines previously set forth, the fibers are deformed mechanically to such an extent that the resetting ability of the fibers is insufficient to upright them again when web 31 reaches exit position 33. Thus the fibers remain in their bent-over positions, producing the typical and much demanded, lightly iridescent changing character of suede. FIG. 3B, illustrates web 31 at exit position 33, and shows that the fibers are permanently bent downward as a result of the bombardment.

EXAMPLE

In a texturing apparatus 30 as shown in FIG. 1, a web 31 having a panel 5 of nonwoven material was treated. The panel 5 of material had previously been coated in a known manner with a pile layer 6 of viscose fibers having a titer of 0.9 detex and a fiber length of 0.5 mm.

The web 31 was moved through treatment chamber 10 at a speed of 4 m/min. The length of the treatment chamber 10 was 1 m; the chamber was partitioned into five subchambers 24–28, one behind the other in the direction of movement of the web 31. Thus the total treatment time was 60 divided by 4=15 seconds.

As has already been mentioned, the treatment chamber 10 had a length of 1000 mm; its width was 1800 mm and its height 60 mm. The five subchambers 24–28 were each filled with 80 balls. The balls had a diameter of 45 mm, a Shore A hardness of 60°. Each ball weighed 50 g. The operating frequency of the vibrator arrangement was set at 40 Hz, which, judging from the noise level of the bouncing balls, meant that the resonant frequency had been reached.

After the treatment, the web 31 exhibited a suede-like, smooth appearance. When brushed by hand, the light reflection capability changed in the typical manner. Under the microscope it was evident that the tiny fibers which had projected from the surface in an almost perpendicular orientation had been bent over in the direction of the plane of the panel 5.

It is noted that the present application, was filed with an Appendix which provides samples having naps that were textured in accordance with the present invention. In both samples the pile was cellulose. In one sample the panel of material was nonwoven fiberous material while in another sample it was plastic.

It will be understood that the above description of the present invention is susceptible to various modifications, changes and adaptations, and the same are intended to be comprehended within the meaning and range of equivalents of the appended claims.

We claim:

1. A method for producing a napped surface that is lightly and irregularly textured, comprising:

coating the surface of a substrate with adhesive;

covering the coated surface with short textile fibers;

allowing the adhesive to harden to produce a pile layer on the substrate; and mechanically deforming the pile layer by permitting a plurality of balls made of resilient material to impact thereon.

2. The method of claim 1, wherein the step of covering is conducted by covering the coated surface with regenerated cellulose fibers having lengths ranging from about 0.35 to about 0.90 mm, and wherein the step of mechanically deforming is accomplished using balls made of a resilient material having a hardness ranging from about 50° to about 70° A-Shore.

3. The method of claim 2, wherein the step of covering is conducted in an electrostatic field using fibers about 0.5 mm long.

4. The method of claim 1, wherein the step of mechanically deforming is accomplished using balls made of a combination of low density polyethylene, polyvinyl acetate, and an ionomer.

5. The method of claim 1, wherein the step of mechanically deforming is conducted by exposing the pile layer to a plurality of bouncing balls for a period ranging from about 10 to about 20 seconds.

6. A substrate having a napped surface produced by the method of claim 1, wherein all portions of the surfaces of the balls employed in the mechanically deforming step are curved.

* * * * *